United States Patent [19]

Konno

[11] Patent Number: 4,847,777

[45] Date of Patent: Jul. 11, 1989

[54] ZEROING CONTROL SYSTEM FOR NUMERICALLY CONTROL APPARATUS

[75] Inventor: Tsukasa Konno, Nagoya, Japan

[73] Assignee: Mitsubishi Denki Kabushiki Kaisha, Tokyo, Japan

[21] Appl. No.: 30,131

[22] Filed: Mar. 26, 1987

[30] Foreign Application Priority Data

Mar. 26, 1986 [JP] Japan .................................. 61-67650

[51] Int. Cl.$^4$ ............................................ G06F 15/46
[52] U.S. Cl. ............................ 364/474.34; 364/474.3; 318/592; 318/626
[58] Field of Search ............... 364/167, 170, 474, 475, 364/513, 474.3, 474.34; 318/568, 592, 594, 603, 626, 632, 661

[56] References Cited

U.S. PATENT DOCUMENTS

| | | | |
|---|---|---|---|
| 4,112,291 | 9/1978 | Fukuyama et al. | 318/603 |
| 4,225,928 | 9/1980 | Ohkubo | 364/474 |
| 4,259,627 | 3/1981 | Matsumo et al. | 318/626 |
| 4,470,108 | 9/1984 | Kato et al. | 318/603 |
| 4,481,588 | 11/1984 | Komiya | 318/626 |
| 4,513,234 | 4/1985 | Nozawa et al. | 318/594 |
| 4,578,748 | 3/1986 | Abe et al. | 364/167 |
| 4,608,654 | 8/1986 | Schafsteller | 364/167 |
| 4,680,520 | 7/1987 | Toyoda et al. | 318/594 |
| 4,710,865 | 12/1987 | Hyomura | 364/170 |

FOREIGN PATENT DOCUMENTS 0187868 7/1986 European Pat. Off. .

Primary Examiner—Allen MacDonald
Attorney, Agent, or Firm—Oblon, Spivak, McClelland, Maier & Neustadt

[57] ABSTRACT

The present invention concerns a numerical control apparatus which automatically processes operations for grid shifting and stores a value resulted from the processing so as to correctly carry out grid-shifting without necessity of the aid of an operator when a numerical control system is newly installed.

5 Claims, 4 Drawing Sheets

ZEROING CONTROL SYSTEM FOR NUMERICALLY CONTROL APPARATUS

BACKGROUND OF THE INVENTION

FIELD OF THE INVENTION

The present invention relates to a numerical control apparatus. More particularly, it relates to compensation of grids to detect the zero point position in a numerical control apparatus.

In such a case that an object to be controlled, such as a working machine, is controlled by a numerical control apparatus, there is usually no synchronization between the zero point (the origin) of the coordinate system of the numerical control apparatus and the zero point (the origin) of the working machine system as the controlled object when a power is supplied to them. Accordingly, it is necessary to conduct operations for zero point return, wherein the working machine is returned to its zero point (the origin) and the present location of the numerical control apparatus is regarded as its zero point (the origin).

There is known in the prior art methods for zero point return such that a movable part is moved towards a zero point. A deceleration signal is generated at a predetermined point to reduce the speed of movement of the movable part. A reference point is then detected by a first grid signal which takes place after the generation of a zero point proximity signal, and then the movable part is moved to the zero point of the machine which may be different from the reference point by a predetermined distance.

FIG. 1 is a diagram showing operations for zero point return.

In FIG. 1, a reference numeral 6 designates a limit switch attached to a movable part such as a table and a numeral 16 designates a ridge provided near the zero point of a fixed part 17 of a machine to cooperate with the limit switch 6.

Now, when the operation of the machine is started in zero point returning mode while the limit switch is in a working zone on the lefthand of the ridge 16, the machine movable part 5 is moved toward the zero point at a fast feeding rate FZ. The limit switch 6 reaches the proximity of the zero point at a time t1 and comes in contact with the ridge 16 for zero point return. Then, the limit switch 6 becomes ON state to generate an ON signal (a deceleration signal), whereby the moving speed of the movable part 5 is reduced. The moving speed is changed to a creeping speed FD at a time t2 and then, the movable part 5 moves at the creeping speed FD. When the limit switch 6 is separated from the ridge 16 at a time t3, the limit switch 6 is changed from ON state to OFF state. Then, the movable part is decelerated and it is once stopped at the grid position A (at which a grid signal G1 is generated) which comes first after the change of the limit switch 5 from the ON state to the OFF state. The position A at which the movable part 5 stops is referred to as a reference point. The movable part 5 in further moved from the reference point A to the zero point D at the creeping speed FD on the basis of data inputted by an operator who has previously obtained the distance between the reference point and the zero point by measurement; thus, the operation for zero point return is finished. In FIG. 1, a character α represents a delay time of a servo system.

Now, description will be made as to grid with reference to FIG. 2.

A resolver generally generates a signal of position of one cycle for each one revolution as it is rotated. When one revolution of the resolver is regarded as being corresponding to the length L (mm) of the movable part and the position in the movement of the movable part is taken as the abscissa as shown in FIG. 2, a positional signal PDW of one cycle is produced for the length L (mm). Zero-cross points G0, G1, G2, G3 . . . in the repeated positional signal PDW are referred to as grids which are produced as the movable part moves every part of length L. Accordingly, when the relative position between the limit switch 6 and the ridge 16 is out of order, i.e. when the position of the limit switch or the ridge is out of one grid pitch, the position for zero point return is deviated. For instance, when the position of the ridge 16 is out of order, whereby the limit switch 6 is changed from ON state to OFF state at a time t3' as indicated by the broken line in FIG. 1, the grid G1 can not be detected (In the normal operation, the grid G1 is detected so that the reference point A is determined.), but a grid G2 is detected; thus, the zero point returning position is deviated.

Further, in adjustment of the position of the limit switch 6 and/or the ridge 16 so that the limit switch 6 is changed from ON state to OFF state between the adjacent grids G0 and G1, when the position where the operation of the switch 6 is changed is closer to the grid G0 or the grid G1, the position may be out of the region between the grids G0 and G1 as time goes on, chattering or other causes, with the result that correct zero point return can not be obtained. This situation often takes place since the pitch between the adjacent grids is several milimeters. Accordingly, it is necessary to adjust the position of the ridge 16 or the limit switch 6 so that the position at which the limit switch 6 is changed from On to OFF comes just at the center of the distance between the grids G0 and G1. However, the relative position between the limit switch 6 and the ridge 16 has so far been determined by repeated trial and error since it is difficult to determine the correct positional relation between the limit switch and the grids by observation or measurement. Accordingly, the adjustment of the position was complicated and it took a considerable time.

To improve the above-mentioned disadvantage, there has been proposed an apparatus shown in FIG. 3. The apparatus in FIG. 3 is so constructed that the position at which the limit switch 6 is changed from ON state to OFF state is substantially at the center of the adjacent grids G0 and G1 by shifting electrically the position of the grids.

In FIG. 3, a reference numeral 5 designates an NC machine operable by a controlling command from a numerical control apparatus 15, a numeral 4 a driving part such as a motor to operate the machine 5, a numeral 7 a resolver as a machine position detecting means which is connected to the driving part 4 to detect the position of the movable part of the machine, a numeral 8 a pulse transforming means for transform an output from the resolver 7 into pulses, a numeral 9 a grid producing means for producing electrical grids for every one revolution of the rotary shaft of the motor of the driving part 4 on the basis of a signal from the pulse transforming means 8 and variables (hereinbelow, referred to as parameters) which satisfy the specification of the machine stored in a RAM 14, a numeral 10 a two port RAM which controls data transmission between central processing units constituting the apparatus, a numeral 11 a data producing means which processes the position of the limit switch 6 separating from the ridge 16 after the switch is changed to ON state by contacting with the ridge and the distance between that position and the first grid, on the basis of a signal from the grid producing means 9 and a signal indicating the situation of the limit switch 6 (namely, an OFF signal produced when the limit-switch is separated from the ridge after the switch has produced an ON signal by contacting with the ridge) and which displays a result of the processing on a CRT. A MCU 13 comprises the pulse transforming means 8, the grid producing means 9, the two port RAM 10 and the data producing means 11 and controls the NC machine to perform correct operations.

In FIG. 3, the grid producing means 9, the data producing means 11 and other structural elements in the MCU 13 are software means and they are shown by blocks for simplification.

The reference numeral 12 designates a programable controller (hereinafter, referred to as a PC) for controlling the operations of the NC machine 5 according to a given sequential operation, a numeral 6 designates a limit switch as a proximal point detecting means fixed to a movable part of the machine 5, the limit switch generating an ON signal by contacting with the ridge 16 provided on the fixed part of the machine 5 at a position near the zero point of the machine and generating an OFF signal to the PC 12 by separating from the ridge 16. In other words, the limit switch 6 is to detect the fact that the movable part is moving in the proximity of the zero point of the machine. The CRT 3 is provided with a key board for inputting data such as the parameters and is adapted to display the position of the limit switch 6 where it is separated from the ridge 16 after the switch 6 has become ON state and the distance between that position and the first grid.

A numeral 2 designates an I/0 interface, a numeral 1 designates a main CPU for controlling the MCU 13, the PC 12, the I/0 interface 2 and others and a numeral 14 designates an RAM for storing the parameters ($\tau$), data for zero point return, data for grid shift (which will be described below) and other data, the RAM 14 being connected to a back-up power source.

The operation of the conventional numerical control apparatus will be described with reference to FIGS. 3 and 4.

As described before, it is desirable that the position B at which the limit switch 6 becomes the OFF state by separating from the ridge 16 (after it has become the ON state by contacting with the ridge 16) is the center of the distance between the adjacent grids G0, G1. However, it has been not always that the position of the limit switch 6 is at the desirable position when the numerical controlling system is installed and the position is often located at an undesirable position. For instance, there is a case that a position B where the limit switch 6 becomes the OFF state by separating from the ridge 16 is not at the center between the grids G0 and G1, but it is deviated as shown in FIG. 4. Namely, the position B is not located to have a relation of x=y, but has a relation of x'>y'. In this case, the position B should be brought into the center between the grids G0, G1 by shifting (in the right direction in the case shown in FIG. 4) the positions of the grids G0, G1 to the positions of the grids G0', G1' by the dimension L when a new numerical control system is installed. The operations for compensation is conducted as follows.

First of all, data for fast feeding of the movable part stored in the RAM 14 is supplied to the two port RAM 10 through the main CPU 1. Then, the MCU 13 outputs a zero-point-returning command to the machine 5. On receiving the instruction, the movable part (such as a table) of the machine 5 is moved at a fast feeding speed FZ toward the machine zero point D. At a position E, the limit switch 6 comes in contact with the ridge 16, whereby the switch 6 becomes ON state to thereby output the ON signal to the PC 12. The PC 12 supplies the information to the CPU 1 through the two port RAM 10. Then, the CPU 1 supplies data for a creeping speed FD stored in the RAM 14 to the two port RAM 10, whereby the MCU 13 outputs a command of the creeping speed to the movable part of the machine 5. The command of creeping speed FD is effected to the limit switch 6 at a position C while the limit switch 6 is in the ON state by the contact with the ridge 16, and the movable part is moved at the creeping speed FD. During the movement of the movable part, the output of the resolver 7 as the position detecting means is inputted into the pulse transforming means 8, which transforms the input into a pulse form to feed the pulses in the grid producing means 9. The grid producing means 9 produces grids G0, G1 . . . for every one revolution of the motor of the driving means 4 on the basis of the parameter $\tau$ stored in the RAM 14. The parameters $\tau$ is inputted in the grid producing means 9 through the two port RAM. While the movable part of the machine 5 continues to move toward the machine zero point D, the limit switch 6 is separated from the ridge 16 to become OFF state. The OFF signal of the limit switch 6 is supplied to the PC 12. When the first grid G1 is detected with respect to the position B where the limit switch is changed to the OFF state, the movement of the movable part is stopped. The detail of producing the grids G0, G1 . . . and a circuit for stopping the movable part in the vicinity of the machine zero point D by using data on the grids are well known, and therefore, description of them is omitted.

On the other hand, the data producing means 11 which receives a signal from the grid producing means 9 as well as the OFF signal of the limit switch 6 supplied from the PC 12 through the two port RAM 10, counts the number of pulses produced in the distance L between the position B where the OFF signal is generated and the position where the first grid G is detected. The data producing means 11 processes the distance L and the data on the distance. The data to be displayed is transmitted to the CRT 3 through the two port RAM 10 and the interface 2 so that the CRT 3 displays the distance l by numerical values. Since the data on the distance l are readable by an operator and the distance F between the grids G0, G1 can be obtained from the parameters $\tau$, the operator calculates a value F/2 as a half of the distance F, and then, he calculates a grid shift quantity by the calculation of the distance $L \times (F/2 - l)$ from the values of the distance l and the half distance F/2. The operator, then, inputs the data on the grid shift quantity to the key board of the CRT 3.

The data are stored in a given area in the RAM 14 through the interface 2 and the CPU 1. After the above-mentioned operations, the movable part of the machine 5 is again moved. In this case, the position B where the OFF signal is generated comes to the middle position (x=y) between the grids G0' and G1' as the positions of the grids G0, G1 are respectively shifted right ward to the position of the grids G0', G1' . . . by the distance L in accordance with the inputted grid shift data. A circuit for shifting the positions of the grids are well known and description of the circuit is omitted.

In the numerical control system shown in FIGS. 3 and 4, there is no change in the position B with respect to the situation before adjustment, however, the position where the movable part of the machine 5 is stopped is changed to the position A' corresponding to the grid G1'. Thus, when the position A corresponding to the grid G1' is at an incorrect position with respect to the machine zero point D as shown in FIG. 4, the distance between the position A' and the machine zero point D is measured by the operator, and the data for compensation is inputted through the key board to store the data in the RAM 14; thus, the adjustment of the zero point return is finished. By conducting such adjustment, when the movable part of the machine 5 is subjected to the movement of zero point return (which should be conducted at the initiation of actual operation of the machine), the movable part is once stopped at the position A' corresponding to the grid G1' according to the grid shifting data, and thereafter, it moves to the machine zero point D in accordance with the data for compensation.

In the conventional numeral control system, however, the CRT 3 only displays the distance l between the position B where the OFF signal is generated and the first grid G1, and the grid shift quantity for the grids G0, G1 can not be obtained only by the knowledge of the distance l. Accordingly, it was necessary to carry out the adjustment by calculating the distance F between the grids G0, G1. However, the distance F varies depending on various parameters $\tau$ for satisfying the specification of the machine. Accordingly, to obtain the distance F, it was necessary to know the various parameters $\tau$ such as a servo parameter given by the specification of the machine. For instance, the parameter is either the radius or the diameter which is necessary for internal processing of the numerical control apparatus and so on. However, for instance, the servo parameter, which may have a different valve depending on the axis of the machine, is known only by design engineers and therefore, it is difficult for an operator other than the design engineer to determine the grid shift quantity. Further, it took much time to calculate the grid shift quantity.

Further, since the conventional system uses a plurality of the CPUs, there causes out of synchronization in timing of processing and it was difficult to detect a signal at synchronized timing. For instance, there was the case that the OFF signal of the limit switch 6 is received with some delay time with respect to the actual time when the limit switch 6 was separated from the ridge. This resulted in the output of different data.

SUMMARY OF THE INVENTION

It is an object of the present invention to provide a numerical control apparatus which automatically processes operations for grid shifting without necessity of the aid of an operator.

It is another object of the present invention to provide a numerical control apparatus which does not eliminates the display of the grid shifting.

The foregoing and the other objects of the present invention have been attained by providing a numerical control apparatus operated by a signal outputted from a proximal point detecting means, mounted on a movable part of a working machine, which detects the movable part being in close proximity of the zero point of the machine, and a signal outputted from a machine position detecting means for detecting the position of the machine when the machine is to return to the zero point, characterized by comprising: (a) a waveform producing means for transforming an output signal from the machine position detecting means into a waveform; (b) a grid signal producing means for producing grid signals based on the output signal in the waveform from the waveform producing means; (c) a data processing means for processing pulses produced in a period from separation of the proximal point detecting means from a ridge to detection of the first grid signal in a way approaching the machine zero point; (d) a pulse number processing means for processing the number of pulses produced between adjacent grids; (e) an intermediate point processing means for processing an intermediate position between the adjacent grids on the basis of the output signal of the pulse number processing means; (f) a grid shift quantity processing means for processing a grid shift quantity on the basis of the output signals of the data processing means and the intermediate point processing means; (g) a code determination means for determining the direction of grid shifting on either the righthand or the lefthand on the basis of grid shift data outputted from the grid shift quantity processing means; and (h) a memory means for storing data outputted from the code determination means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
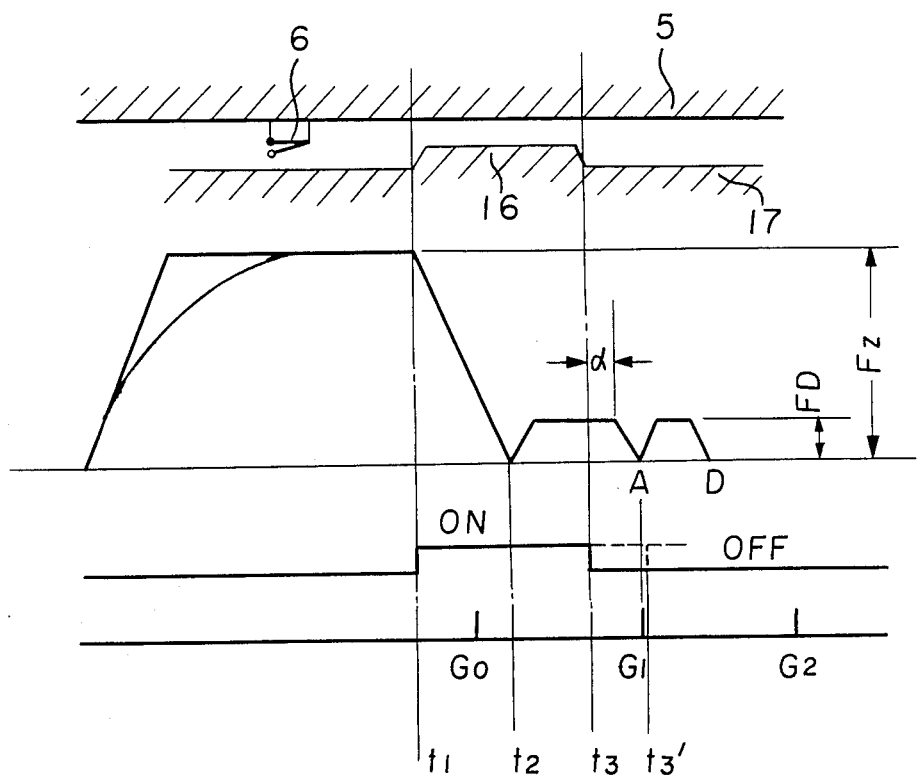
FIG. 1 is a diagram for explaining a method of zero point return for a numerical control apparatus.
Figure 2:
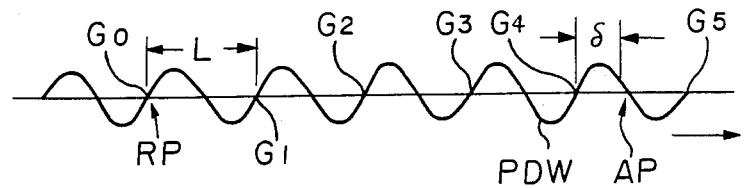
FIG. 2 is a diagram showing the formation of grids.
Figure 3:
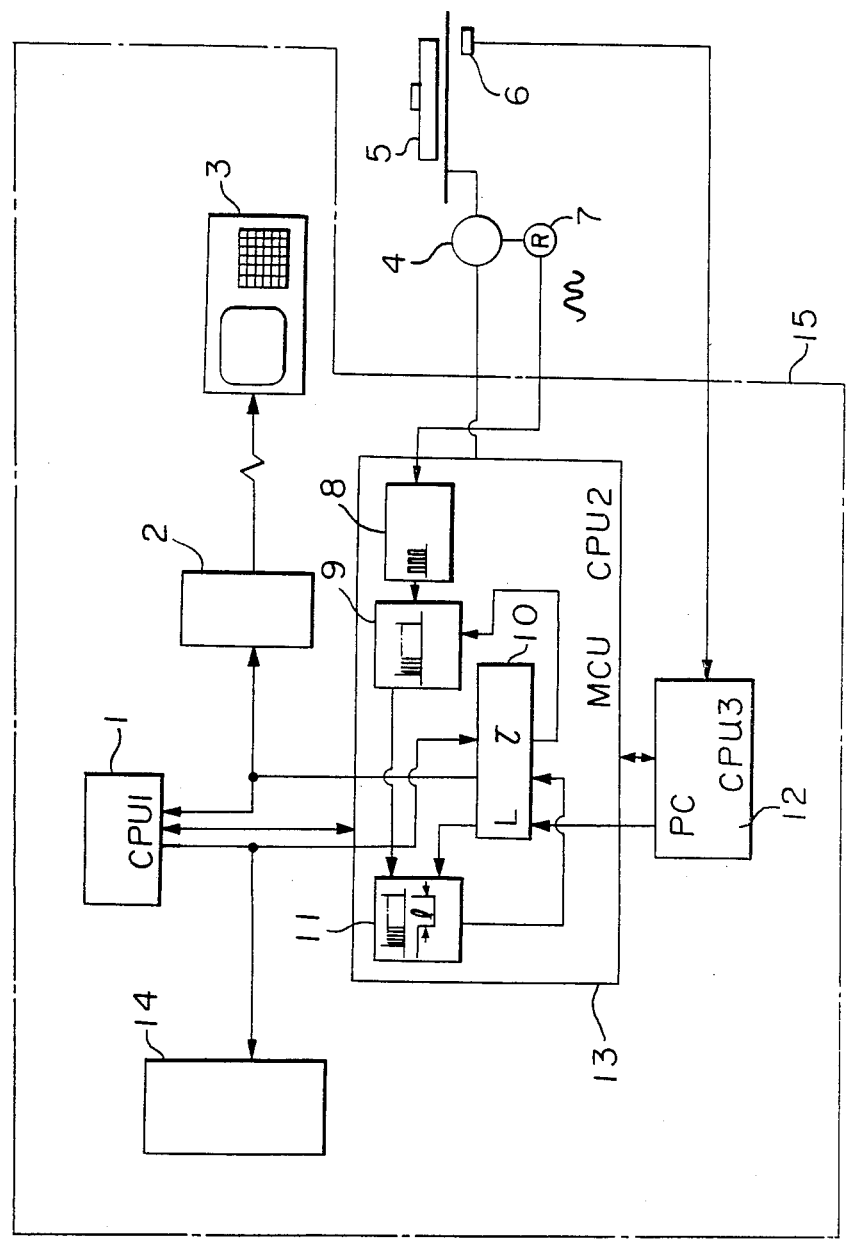
FIG. 3 is a block diagram showing a conventional numerical control system.
Figure 4:
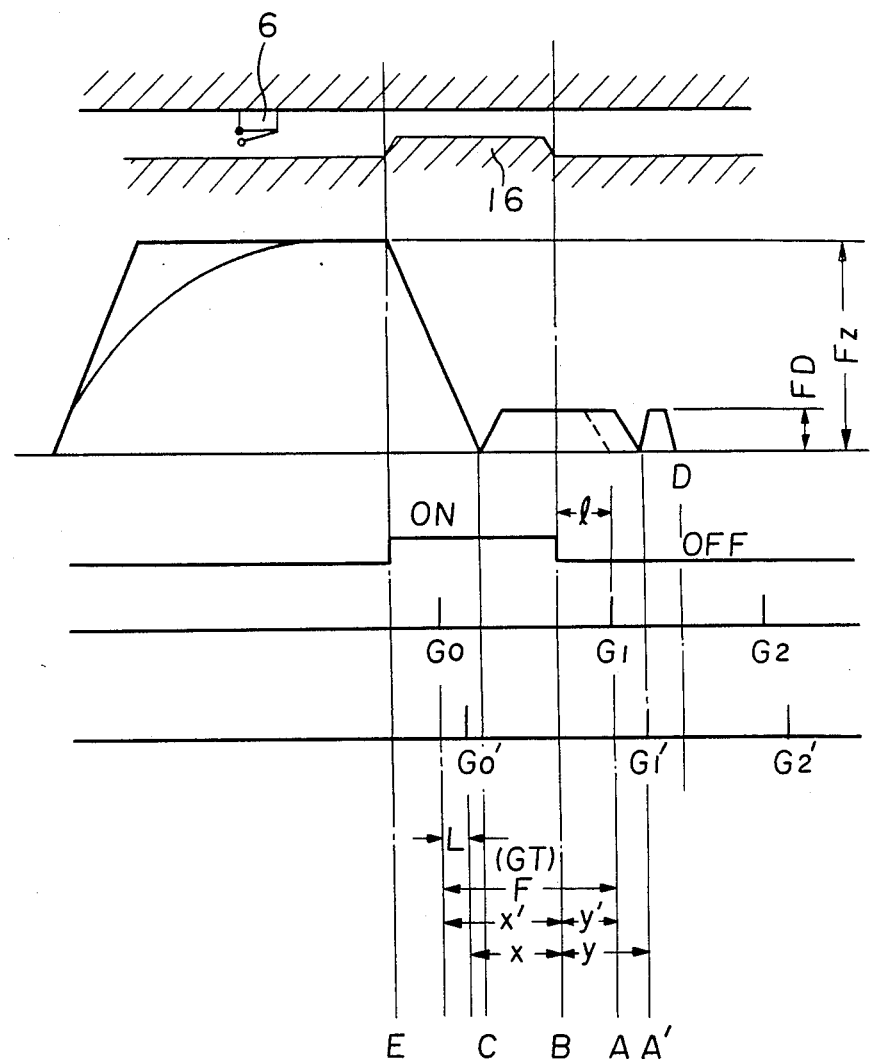
FIG. 4 is a diagram showing the operation of a typical numeral control system.

An embodiment of the present invention will be described with reference to FIGS. 4 and 5, wherein the same reference numerals as in FIG. 3 designate the same or corresponding parts.

Figure 5:
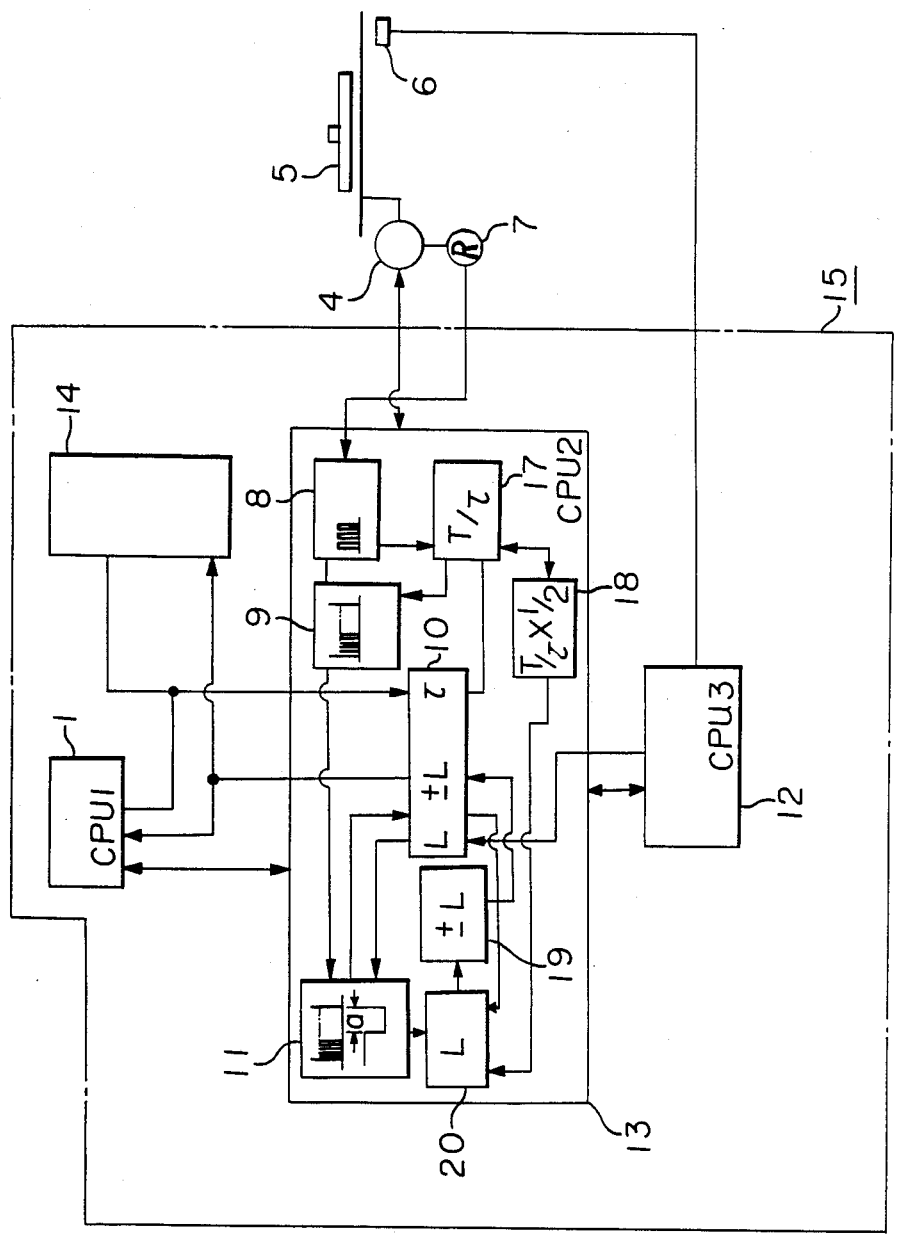
FIG. 5 is a block diagram showing an embodiment of the numerical control system according to the present invention.

In FIG. 5, a reference numeral 17 designates a pulse number processing means for counting the number of pulses produced between two adjacent grids on the basis of the signal of the pulse transforming means 8 and various parameters which are stored in the RAM 14 and satisfy the specification of a specific machine, a numeral 18 designates an intermediate point processing means for processing an intermediate point between the grids (the number of pulses between the grid multiplied by ½) taking account of the number of pulses outputted from the pulse number processing means 17, a numeral 20 designates a grid shift quantity processing means for processing a grid shift quantity on the basis of the signal of the intermediate point processing means 18 and the signal of the data producing means 11, a numeral 19 designates a code determination means for determining the direction of grid shifting on either the righthand or the lefthand on the basis of the grid shift data outputted from the grid shift quantity processing means 20 and the signal of the data producing means 11. In FIG. 5, each of the processing means 17, 18, 20 and the code determining means 19 of the MCU 13 are shown by blocks for simplification of these elements operable by software.

The operation of the numerical control system of the present invention will be described. The adjustment for zero point return is carried out when the system is newly installed, for instance.

The CPU 1 supplies to the two port RAM 10 data for fast feeding of the movable part to the zero point of the machine 5, the data being stored in the RAM 14. At the same time, the MCU 13 outputs a command of zero point return to the machine 5. Then, the movable part (such as a table) of the machine 5 is moved at a fast feeding speed FZ toward the machine zero point D. When the limit switch 6 comes in contact with the ridge 16 at the point C, the limit switch 6 becomes ON state and an ON signal is fed to the PC 12. The PC 12 supplies the inputted information to the CPU 1 through the two port RAM 10. Then, the CPU 1 transmits the data of a creeping speed which are stored in the RAM 14 to the two port RAM 10. When the RAM 10 receives the date, the MCU 13 generates a command of creeping speed to the machine 5. On receiving the command, the moving speed of the movable part of the machine 5 is changed to the creeping speed FD at a point B at which the limit switch 6 is in the ON state by the contact with the ridge 16. During the movement of the movable part at the creeping speed FD, the output of the resolver 7 as the position detecting means is inputting in the pulse transforming means 8. The pulse transforming means 8 transforms the input of the resolver 7 into a pulse form. At the same time, the grid producing means 9 produces grids G0, G1 . . . for every one revolution of the motor of the driving means 4 on the basis of the output of the pulse transforming means 8 and parameters which are stored in the RAM 14 and are inputted through the two port RAM. On the other hand, the movable part of the machine 5 continues to move toward the machine zero point D. When the limit switch 6 is separated from the ridge 16, the OFF signal is generated and the OFF signal is outputted into the PC 12. The movement of the movable part is stopped when the first grid G1 is detected following the position B at which the limit switch 6 generates the OFF signal. The detail of production of the grids G0, G1 . . . and a circuit for stopping the movable part in the vicinity of the machine zero point D by using the grids are omitted since they are well known techniques.

The data producing means 11 receives the signal of the grid producing means 9 and the OFF signal of the limit switch 6 inputted through the PC 12 and the two port RAM 10, and processes the distance l between the OFF signal generating position B and the first grid G1 by counting the number of pulses produced in the distance l. On the other hand, the pulse number processing means 17 processes the number of pulses GT produced between the grids G0, G1 by using the output of the pulse transforming means 8 and the data on the parameters stored in the RAM 14 through the two port RAM. The number of pulses GT is obtainable by the following equation (1).

$$GT = T/\tau \quad (1)$$

wherein $\tau$ is a parameter and T is the number of pulses produced in one revolution of the resolver 7.

The intermediate point processing means 18 processes an intermediate distance x or y between the grids G0, G1 based on the output of the pulse number processing means 17. The intermediate distance x or y is obtained by the following equation:

$$x \text{ (or } y) = T/\tau \times \tfrac{1}{2} \quad (2)$$

The grid shift quantity processing means 20 processes the grid shift quantity L on the basis of the output of the intermediate point processing means 18 and the output of the data processing means 11. The grid shift quantity L is obtained by the following equation:

$$L = x \text{ (or } y) - l \quad (3)$$

The code determination means 19 outputs grid shift data based on the output of the data processing means 11 and the output of the grid shift quantity processing means 20, wherein if $L > l$, shifting on the left side is effected, whereas shifting on the right side is effected if $L < l$. In this embodiment, the grid shift data for effecting the right side shifting is provided because $L < l$. The grid shift data are inputted in a given area of the RAM 14 through the two port RAM 10.

Then, the movable part of the machine 5 is again moved in the same manner as above-mentioned conventional system. In this case, since the position of the grids G0, G1 . . . is shifted right ward to the position of G0', G1' . . . by the distance L in accordance with the grid shift data, the OFF signal position B is brought to the central position (x=y) between the grids G0' and G1'. The detail of the circuit for effecting the grid shifting is omitted. Although the OFF signal position B is not changed after the adjustment, the movable part of the machine 5 is stopped at the grid G1' position which is different from the position before the adjustment. Thus, when the grid G1' position is deviated from the machine zero point D, the distance between the position A' and the zero point D is measured by the operator and the data for compensation are inputted in the RAM 14 for adjustment of the system.

After the adjustment, the movable part of the machine 5 is once stopped at the grid G1' (the position A') according to the grid shift data and is moved to the machine zero point D in accordance with the data for compensation. This operation for zero point return should be effected before the actual machining operation.

The description has been made as to the adjustment at the time of new installment of the numerical control system. This invention is, however, applicable to the case of replacement of the resolver or other devices.

Obviously, numerous modifications and variations of the present invention are possible in light of the above teachings. It is therefore to be understood that within the scope of the appended claims, the invention may be practiced otherwise than as specifically described herein.

What is claimed is:

1. A numerical control apparatus operated by a signal outputted from a proximal point detecting means, mounted on a movable part of a working machine, which detects said movable part being in close proximity of a zero point of the machine said zero point being defined as reference point for movement of said machine, and a signal outputted from a machine position detecting means for detecting the position of the movable part of said machine when the machine is to return to said zero point comprising:

a zeroing means having,
- (a) a waveform producing means for transforming an output signal from said machine position detecting means into a waveform;
- (b) a grid signal producing means for producing signals based on the output signal of the waveform from said waveform producing means and which represent a grid formed on said movable part;
- (c) a data processing means for processing pulses produced during the time period that occurs from the separation of said proximal point detecting means from a ridge to detection of a first grid signal that is produced when the machine is moved in a direction approaching the machine zero point;
- (d) a pulse number processing means for processing the number of pulses produced between adjacent elements in said grid;
- (e) an intermediate point processing means for processing an intermediate position between the adjacent elements of said grid on the basis of the output signal of the pulse number processing means;
- (f) a grid shift quantity processing means for processing a grid shift quantity on the basis of the output signals of said data processing means and said intermediate point processing means;
- (g) a code determination means for determining the direction of grid shifting in either a negative or positive direction, with said positive and negative directions being artificially selected based upon and in the original plane of movement of said machine and on the basis of grid shift data outputted from said grid shift quantity processing means; and
- (h) a memory means for storing data outputted from said code determination means.

2. The numerical control apparatus according to claim 1, wherein said proximal point detecting means is a limit switch and said machine position detecting means is a resolver.

3. The numerical control apparatus according to claim 1, wherein said data processing means processes a number of pulses taking account of parameters which satisfy the specification of the machine.

4. The numerical control apparatus according to claim 1, wherein said zeroing means are software-operating means.

5. The numerical control apparatus according to claim 1, which further comprises:

means for causing said movable part to move to the zero point on the basis of the grid shift data stored in said memory means.

* * * * *